Feb. 23, 1960

C. G. PALMER 2,926,247

LINEARIZING INDICATING SYSTEM

Filed Dec. 4, 1956

INVENTOR.
CHARLES G. PALMER
BY
Allen E Hambly
ATTORNEY

Feb. 23, 1960 C. G. PALMER 2,926,247
LINEARIZING INDICATING SYSTEM
Filed Dec. 4, 1956 2 Sheets-Sheet 2
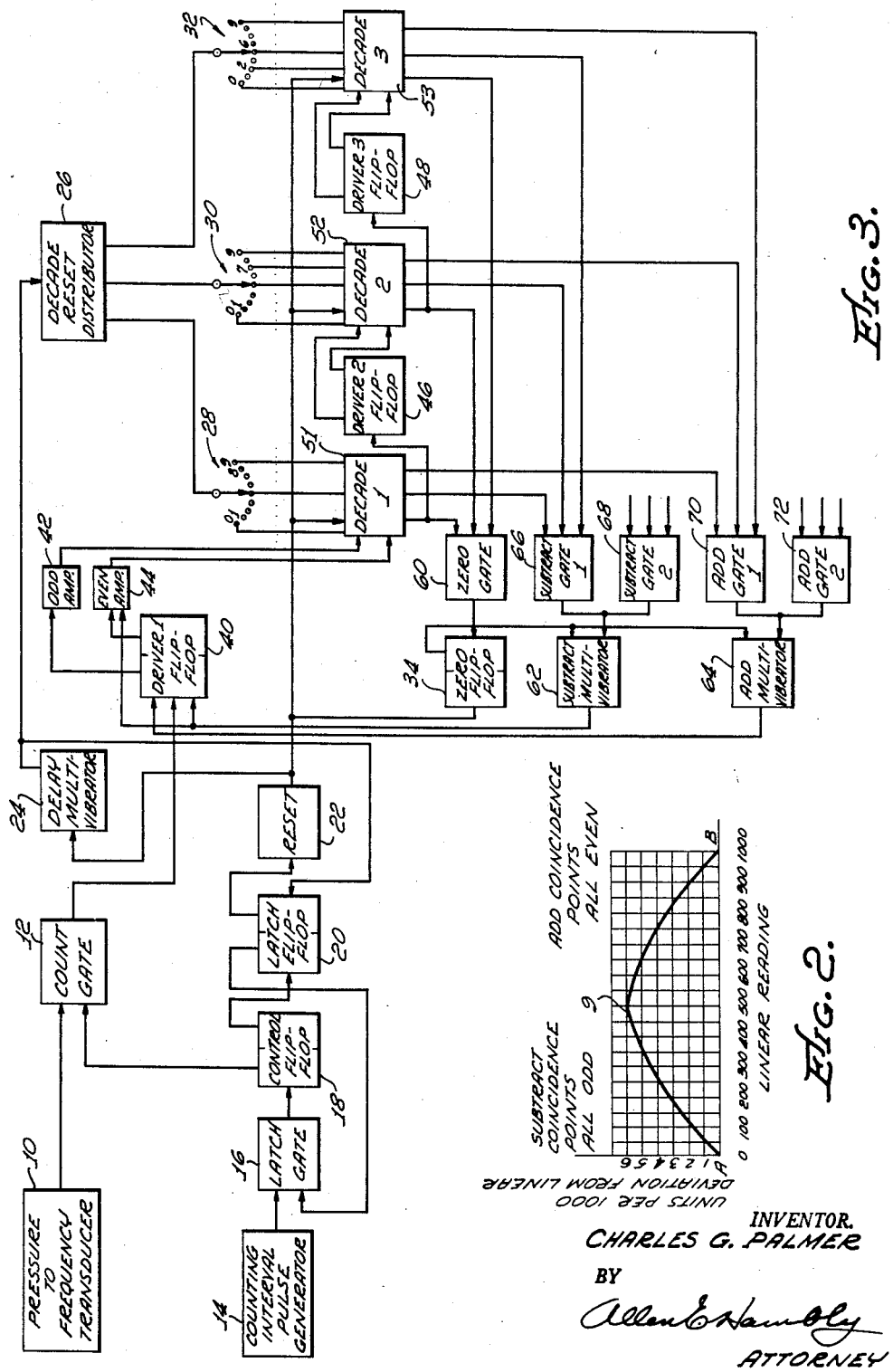
INVENTOR.
CHARLES G. PALMER
BY
Allen E Hambly
ATTORNEY

United States Patent Office 2,926,247
Patented Feb. 23, 1960

2,926,247

LINEARIZING INDICATING SYSTEM

Charles G. Palmer, Santa Ana, Calif., assignor to Borg-Warner Corporation, Chicago, Ill., a corporation of Illinois Application December 4, 1956, Serial No. 626,182

15 Claims. (Cl. 250—27)

This invention relates to measuring systems and, more particularly, to improved indicating apparatus for a measuring transducer of the type having a nonlinearly varying output in response to linear variations of a quantity being measured.

In a patent to Frank Reiber, Patent No. 2,455,021, which was issued on November 30, 1948, and is for a Pressure Meter, there is described a novel transducer for measuring pressure variations. This transducer includes an oscillator having a stretched wire in the frequency-determining circuit thereof. Variations in pressure to which the transducer is exposed cause variations in tension of this stretched wire. As a result, the frequency of oscillation of the oscillator will vary with pressure. The variations in oscillation, however, are inverse with the variations in pressure. Upon investigation, it was further found that over certain ranges of pressure variation, the frequency of oscillation did not vary linearly therewith. Instead, substantially a square-law relationship was detected. Thus, an indicating means such as a counter which counts the pulses of oscillation generated cannot directly give a correct indication of the pressure within the range of occurrence of this square-law deviation. The indication of the pressure given by the counter-indicating means would only be approximate in these regions.

An object of this invention is the provision of a novel arrangement for providing a linearizing correction to a counter receiving pulses from a nonlinear pulse source.

A further object of the present invention is the provision of a novel indicator for measuring apparatus which can compensate for nonlinearities which occur in the operation of said measuring apparatus.

Yet another object of the present invention is the provision of a novel and accurate indicating system for a measuring transducer of the type which provides output pulses at a frequency which varies inversely as well as nonlinearly with variations in the quantity being measured.

These and other objects of the present invention are achieved by providing a counter with means to sense those counts which are in the regions of nonlinearity. In response to the sensed counts in one nonlinear region, means are provided whereby input pulses are not permitted to advance the counter. In another nonlinear region upon the counter attaining counts in this region pulses are applied to the counter to add counts in addition to the input pulses. Thus a linearized digital indication is achieved by the counter by addition or subtraction in the nonlinear regions of the input source as is required.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 2 is a curve derived from Figure 1, showing the deviation of the response from linear;

Figure 3 is a block diagram of an embodiment of the invention; and

Figure 1:
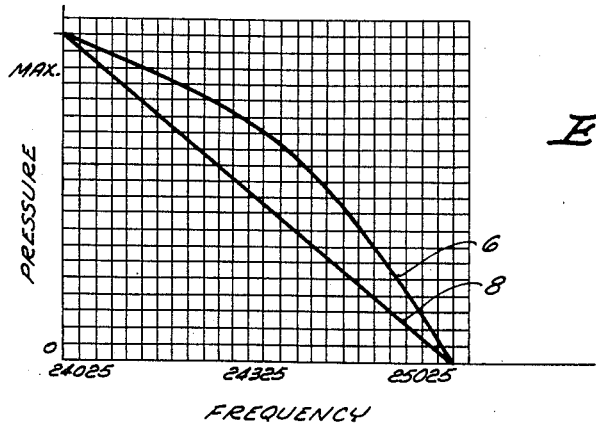
Figure 1 is a curve representative of the nonlinear response of a typical transducer and the desired linear response.

Reference is now made to Figure 1, where there is shown by way of illustration and to assist in understanding the invention a frequency-versus-pressure characteristic curve 6 derived from a transducer of the type described in the previously noted patent to Frank Reiber. Curve 6 shows that the frequency output of the transducer varies nonlinearly with the pressure. A suitable linear variation is shown by the straight line 8. If the frequency were directly measured as an indication of the pressure, it would obviously provide an inaccurate result.

The nonlinear transducer cited above, by way of example, at zero pressure provides an output frequency of 25,025 cycles per second and at maximum pressure provides an output frequency of 24,025 cycles per second. Since the difference between zero and maximum pressure is 1,000 cycles per second, a frequency counter having a capacity of 1,000 can be employed to provide a pressure indication from the transducer output. Thus assuming the counts from zero to 1,000 instead of from 24,025 to 25,025, Figure 2 is a plot of the deviation from linear which is derived from the curve of Figure 1.

The curve 9 in Figure 2 has shown therealong the actual count of a counter as opposed to the required linear count which is plotted along the horizontal co-ordinate. Thus, when the counter indicates a count of 50, a corrected linear reading is 101. A correction is achieved by a means to be shown herein which prevents the counter from counting one pulse. In effect, a count of one has been subtracted from the counter. At the next point, where, if the counter was allowed to function without alteration it would deviate two counts from linear, another count may be subtracted from the counter to perform the needed correction.

When the maximum nonlinearity point or the midpoint of the deviation curve has been reached, substantially six counts have been subtracted. Since, when the midpoint of the deviation curve is passed the deviation from linear begins to decrease, in order to maintain the counter indication linear it becomes necessary to add counts to gradually reduce the extent of correction achieved by the subtraction of counts. Thus by the time the counter has reached the count of 1,000, six counts have been added to cancel the effects of the subtraction of six counts.

The curve shown in Figure 2 shows the points selected, in an embodiment of the invention which was built, for subtraction of counts where the slope of the curve is positive and for addition of counts where the slope of the curve is negative.

In an embodiment of this invention, in the regions of nonlinearity where the slope of the deviation curve is positive, the counter has apparatus which senses the count in these regions and prevents the application of some input pulses, thus effectively achieving subtraction. In the nonlinear regions where the slope of the deviation curve is negative, the counter has apparatus for sensing the count in these regions and applying extra pulses, thereby adding to the count.

As pointed out previously, since with the particular transducer with reference to which the invention is being described the total frequency change from maximum to minimum pressure is only 1,000 cycles, it is only necessary to provide a counter having this capacity and not one with a capacity for counting 25,025 cycles. Further, since the frequency at zero pressure is higher than the frequency at a maximum pressure compensation may be provided therefor by, in effect, predetermining the starting condition of the counter. In accordance with the teachings in my application for an Indicating System, Serial No. 626,181, filed December 4, 1956 (Docket 87/145), since the maximum frequency at zero pressure is 25,025 c.p.s., the starting condition for the counter which can count to a maximum of 1,000 c.p.s. is set at 974 or the nines complement of 025, and the count indicators for the counter are reversed to indicate the nines complement of the count in the counter. Thus, at the end of the predetermined interval, if the counter registers a zero count, it is known that the pressure is zero. Counts less than the maximum are then readable in terms of pressure.

Referring now to Figure 3, there may be seen a block diagram of an embodiment of the invention. The rectangle 10 represents the pressure-to-frequency transducer of the type described in the previously mentioned patent to Frank Reiber. This rectangle 10 represents the transducer and all the associated electronic circuits required to derive therefrom pulses properly shaped to be applied to the subsequent gates and flip-flop apparatus. Thus, the output from the pressure-to-frequency transducer 10 comprises a train of pulses at a frequency which is determined by the pressure being measured. These pulses are applied to a count gate 12. This gate has two inputs, one of which receives the pulses from the pressure-to-frequency transducer, the second of which is an enabling input. In the absence of this enabling input, the count gate cannot transmit the pulses received from the pressure-to-frequency transducer to the subsequent apparatus.

The time during which this count gate is enabled or opened is controlled by the duration of an enabling pulse applied thereto. This enabling pulse is generated by a means of a counting-interval pulse generator 14. This may comprise a crystal oscillator of a suitable frequency which is divided down and has the output properly shaped to drive subsequent electronic apparatus. This type of circuitry is well known in the art, being used, for example, in television transmitters for generating synchronizing signals. The necessity for holding the count gate open for predetermined time intervals should be appreciated from the fact that the transducer provides oscillations continuously. It is only by counting the oscillations received over a predetermined interval that the correlation between the count and the pressure can be made. It is also necessary, in order to have an intelligible reading of the counter output, to recurrently allot the counting interval. This function is also performed by the apparatus which applies the pulses to be counted over a predetermined interval.

The output of the counting-interval pulse generator 14 is applied to a latch gate 16. The latch gate is similar to the count gate and has an input for receiving the counting interval pulses and another input which is the enabling input. In the absence of an enabling input, the output from the latch gate is cut off. The latch-gate output is applied to a control flip-flop 18. Upon receiving an output from the latch gate, the control flip-flop is driven to one stable state wherein it applies an output to the count gate 12 to hold it open for the desired interval of time. A succeeding pulse from the latch gate to the control flip-flop drives it to its second condition of stability. This, in turn, removes the enabling pulse from the count gate and applies an output to drive the latch flip-flop. As a result, the latch flip-flop removes its enabling input to the latch gate. The latch flip-flop also applies a pulse to the reset generator 22. This may be a gas tube which is rendered conductive by this pulse. The output of the reset pulse generator 22 is applied to a delay multivibrator 24. The delay multivibrator 24 is driven to its unstable state and after the elapse of a predetermined suitable interval returns to its stable state, whereupon it applies an output pulse to the latch flip-flop 20 to drive it to its initial condition whereby it applies an enabling input to the latch gate 16. Thereby, latch gate 16 is opened again. The delay multivibrator output is also applied to a rectangle 26, which may be designated as the decade reset distributor. This is a dividing network which distributes the reset pulse via preset selecting switches 28, 30, 32 to the decades 51, 52, 53, to reset them to their initial or predetermined count condition.

The output of the reset generator 22 is also directly applied to a reset zero flip-flop 34, as well as the three decades. If a gas tube type of counter is employed, the reset pulse is applied directly to the tubes to first extinguish all the arcs in the tubes. Following this, the reset pulse via the decade reset distributor resets the decades to their predetermined count condition. If the well known flip-flop decimal counter is employed, since no arcs need be extinguished, the reset generator pulse is applied first to reset the counter to zero and then through the reset distributor to preset the counter stages to the desired count.

Referring back now to the count gate 12, it may be seen that this count gate is held open for a predetermined interval of time, thus permitting pulses from the pressure-to-frequency transducer to be applied therefrom to the following driver flip-flop 40. The driver flip-flop has its two outputs respectively connected to an odd amplifier 42 and an even amplifier 44. The operation involved here is that the driver flip-flop receives a succession of pulses, in response to which it is driven to first one and then the other of its two stable conditions. When in one of its two stable conditions, the odd amplifier is rendered conductive to provide an output to the decade 51. When the driver flip-flop is in the second of its two stable conditions, the even amplifier is rendered conductive to provide an output to the following decade.

The decades, respectively numbered 51, 52, and 53, may be any type of well-known decimal counter. The usual, well-known type of decade counter is one having a single input. The type of decade counter preferred here is a two-input type, to be described infra. If a single-input type of decade is employed, then output is applied thereto from only the even amplifier and the counting interval is doubled, or the count indication is multiplied by two. However, it is preferred to use a decade tube for each decade, which is known as a beam-switching tube type MO-101. This beam-switching tube is manufactured by Haydu Brothers of Plainfield, New Jersey, a subsidiary of Burroughs Corp. The tube is also known as the Burroughs Magnetron Beam-Switching Tube. A description of the tube and its operating characteristics and method of operation may be found in an article entitled "Multioutput Beam-Switching Tubes for Computers and General Purpose Use" by Sol Kuchinsky, in the Convention Record of the 1953 National Convention of the I.R.E., Part VI. The tube has ten individual positions. A common central cathode is used to supply electrons to each one of these positions in succession as the count progresses. At each position there is provided an electrode called a spade, which automatically forms and locks a beam onto a target output plate, and a switching grid which enables the switching of the beam from one target to the adjacent target in succession.

The electron beam is switched from target to target by applying a negative pulse in succession to the grids. In order to simplify the function of switching and/or counting, all of the alternate grids, termed the even-numbered grids, are connected together and brought out to a common external connection, and all of the remaining grids, termed the odd-numbered grids, are connected together and brought out to a second external connection. A switching progression is effectuated by first applying a negative pulse to the odd-numbered grid connections and then applying a negative pulse to the even-numbered grid connections. The beam is thereby switched in succession from target to target. The beam is maintained at the target to which it was last switched, if no other switching voltages are applied to the switching grids.

The application of a negative voltage to the odd grids successively or to the even grids successively does not cause a progression of the beam. It is only when the negative voltage is applied alternately first to the odd and then to the even-numbered grids that a stepping along of the beam from target to target occurs. When all grids are made positive, the beam is extinguished. Establishing a beam again is preferably performed by applying a negative voltage to the one of the spades at which it is desired that the beam be established. Leads are brought external to the tube from all the spades to make presetting of the tube count possible.

With the alternative application of pulses from the odd-even amplifiers to the first decade, the first decade will advance in response to the sequence of input pulses being applied thereto. The output of the first decade, when it reaches the zero state after being driven through a complete cycle, is applied to drive a second driver flip-flop 46. Its output is similarly alternately applied to odd and even grids to advance the count. When the second decade reaches a filled condition, which occurs when it is driven through a cycle back to the condition with its beam formed at the zero target, it applies an output to drive the third driver flip-flop 48. The output of the third flip-flop is also an odd-even sequence of outputs which is applied to odd and even terminals of the third decade to advance its count. As many of these decades in sequence may be employed as are required to establish a desired count.

It was previously stated that each of the decade beam-switching tubes has ten separate anodes. A separate load resistor may be connected to each one of these separate anodes and a separate output may be derived from each of these. Thus, in order to sense when the counter has reached a desired count, it is merely necessary to determine when the beam is present at the one of the targets in each one of the decades which represents the desired count. For example, if a desired count of 260 is to be sensed, then the sensing connection is made to the zero target of the first decade to the sixth target of the second decade and the second target of the third decade. When the beam is present at a target, the voltage drops substantially to the value of the cathode potential. For the selected targets, this may be sensed by gating arrangements well known in the art, such as the diode-gating arrangements known as coincidence gates which are described and shown in an article by T. C. Chen, entitled Diode Coincidence and Mixing Circuits in Digital Computers, published in the Institute of Radio Engineers Proceedings, vol. 38, pp. 511–514, May 1950.

A zero gate 60 senses the fact that all decades are at the zero condition when the beam is present at each one of the zero targets. The output of the zero gate is applied to a zero flip-flop 34 to drive it to a condition where it no longer inhibits the operation of a subtract-multivibrator 62 and an add-multivibrator 64. The reasons for this will be given subsequently herein.

From the above description, it should be apparent how it is possible to detect those counts within the regions of nonlinearity in which it is desired to subtract or prevent additional pulses from being counted and to detect those counts at which it becomes necessary to add to the count in the counter to correct for such nonlinearity. The subtract gate 66 senses when the decades have attained a count which is in the region where subtraction is required to provide the linearizing correction. The subtract gate 68 will detect a second count in that region. As many subtract gates and sensing connections are employed as are required to cover the region wherein correction is desired. Each one of the subtract gates, in turn, will be enabled to apply a pulse to a subtract multivibrator. The subtract multivibrator 62 applies an output to the driver flip-flop 40, whereby it is driven to the condition opposite to the one in which it was driven by the last pulse output from the count gate. Simultaneously therewith, a pulse is applied to the amplifier which is receiving an output from the driver flip-flop responsive to the drive from the subtract multivibrator. The pulse applied to the amplifier is an inhibiting pulse and blocks it from transmitting to the counter. The result of this operation is that when the next pulse arrives from the count gate the driver flip-flop turns over and applies an output to the same amplifier as received an output responsive to the preceding pulse from the count gate. Since, as previously described, alternative inputs are required in order to make the decade step along or sequence, the decade is not sequenced in response to the output from the count gate, since it receives the same output from the driver flip-flop twice. However, the next pulse from the count gate will drive the flip-flop again and this time the output will be countered and the counter will sequence along to the next count. Effectively, therefore, the counter has skipped one input pulse which, in effect, is the same as subtracting a pulse from those being supplied for counting purposes.

The add gate 70 will sense when the decades reach a second nonlinear region wherein it is desired to add a pulse to those in the counter. The add gate 70 will thus drive the add multivibrator 64, which in turn applies a pulse to the driver flip-flop. This turns over the driver, thus providing an output to the decade and effectively adding a count. The second add gate 72 also will operate in response to sensing the arrival of the counter at another point in the nonlinear region. It will also cause the add multivibrator to supply a driving pulse which is counted in addition to the pulses being received from the count gate.

Since the decades are all reset to a predetermined count condition, it is desired that the add and subtract multivibrators be prevented from functioning until such time as the counter has passed through the initial zero count condition and then continues on in its count. Inhibiting operation is obtained by the provision of the inhibit output from the zero flip-flop 34 until the zero gate 60 has sensed the fact that the decades have all passed through the zero condition. The zero flip-flop is then driven to remove its inhibiting output. At the time of reset, the reset generator 22 will reset the zero flip-flop so that again it provides its inhibiting output until the previously described operation occurs.

To summarize the operation of the system shown in Figure 3, pulses are generated by the pressure-to-frequency transducer 10, which have a frequency which is related to the pressure. The count gate 12 is kept open for a suitable counting interval by an output from the control flip-flop 18. Pulses are applied to the following decade counter by means of the driver flip-flop 40 to which the output of the count gate is appleid. The counter is driven through zero, since its count is initially not at zero but at some value determined by the zero-pressure frequency reading of the transducer. After the count is passed through zero, the add and subtract multivibrators 62, 64 are enabled by the zero flip-flop 34. When the counter passes through a nonlinear region in which corrective action is required in the form of the addition of counts, the counts at which correction is required are sensed and an add gate is opened to drive an add multivibrator 64 which applies a pulse to the driver flip-flop 40 to be added to the count already in the counter. When the counter passes through a region where correctcion in the form of a subtraction is required, the sensing gate applies a pulse to a subtract multivibrator which, in turn, drives the driver flip-flop.

The output of the driver flip-flop is prevented from being applied to the counter. The succeeding counting pulse drives the driver flip-flop to the same condition as it was left in by the last pulse counted. Thus, the next pulse received is not counted. At the end of the count interval, the control flip-flop is driven to close the latch gate 16 by driving the latch flip-flop 20. The output of the latch flip-flop enables a reset pulse generator and the count gate is disenabled. The reset generator output extinguishes all the arcs in the counter stages and also resets the zero flip-flop to its inhibit condition. The output of the reset-pulse generator is also applied to a delay multivibrator which, after a suitable interval to permit the previously described operations to be performed, applies its output first to the decade reset distributor which sets the various decades of the counter to the predetermined count condition. The output of the delay multivibrator is also applied to the latch flip-flop to reset it, whereby it opens the latch gate 16 so that upon the occurrence of the next counting-interval pulse the count gate 12 will be opened to initiate a new counting cycle.

Figure 4:
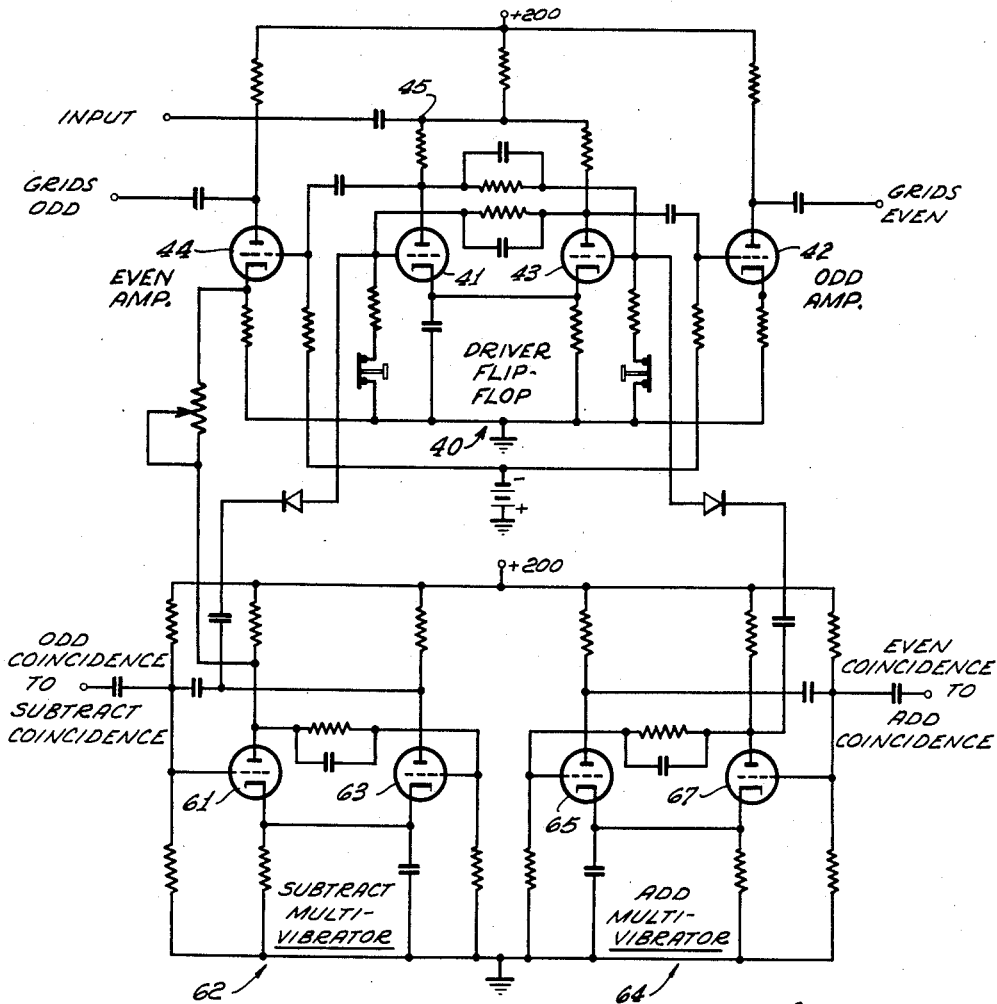
Figure 4 shows the circuit details for the add and subtract portion of the embodiment of the invention.

Figure 4 is a circuit diagram of the driver flip-flop, the odd-even amplifiers, the subtract multivibrator, and the add multivibrator. It may also be noted here that the flip-flops and the multivibrator shown in this drawing are also usable for the flip-flops and multivibrators found elsewhere in Figure 3. In Figure 4 there is shown the driver flip-flop 40, the subtract multivibrator 62, and the add multivibrator 64. The add and subtract multivibrators each include two tubes which, for the subtract multivibrator, are designated by the reference numerals 61, 63, and for the add multivibrator are designated by the reference numerals 65, 67. These two tubes are cross-connected and biased so that in the standby condition tubes 61 and 67 are conducting and tubes 63 and 65 are not conducting. Flip-flop 40 also includes two tubes, respectively designated as 41 and 43. The flip-flop has its grids and anodes cross-connected so that the flip-flop will be stable with conduction in either one of the tubes. A common input point 45 is provided, to which negative pulses are applied from the count gate 12. In response to a succession of negative pulses, flip-flop 40 is driven from one condition of stability to the other condition of stability and then back. The anode of tube 41 of the flip-flop is coupled to the grid of the odd amplifier 42, the anode of the tube 43 of the flip-flop is coupled to the grid of the even amplifier 44. In this manner, the odd and even amplifiers are driven by the flip-flop to apply successive driving pulses to the succeeding counter stage.

Referring now to the subtract multivibrator, upon a coincidence being sensed in the nonlinear region in which it is desired to subtract from the incoming pulses being applied to the counter, a negative pulse is applied to the grid of tube 61. This causes the tube to cease conduction and a positive pulse is applied as a result from its anode to the cathode of the even amplifier. This has the effect of cutting off or blocking this even amplifier so that it will not transmit any output for the duration of the pulse being applied. Simultaneously with the application of a positive pulse to the even amplifier cathode, a negative pulse is derived from the anode of tube 63 of the subtract multivibrator. This is applied to the grid of tube 41 in the flip-flop. This causes the tube to become nonconducting. At this time there will also be an output derived from the anode of the tube 41 which is positive. However, since the amplifier 44 is blocked, this will not be transmitted to advance the counter.

After a time determined by the circuit parameters of the multivibrator 62, it restores itself to its standby condition, whereby it can be operated again to trip the driver flip-flop without applying a pulse to the counter. The next incoming pulse to the driver flip-flop will drive the flip-flop to the next stable condition, wherein amplifier 42 applies its output to the odd grid counter input. However, since the previous input pulse to the driver flip-flop had applied a driving pulse to the odd grid counter input, the counter will not be advanced in response to this succeeding pulse. In effect, this amounts to a prevention of a pulse being counted by the counter, or is a subtract operation.

The operation of the add multivibrator is a simple one. Upon there being a sensing of a count in the nonlinear region wherein it is desired to correct by adding a count to the incoming pulses being counted by the counter, the multivibrator 64 is driven to an unstable condition. An output is derived from tube 67, which is a positive pulse. After a certain time delay multivibrator 64 returns to its stable state, and the anode of tube 67 goes negative. This negative going pulse is then differentiated to apply a negative potential to the grid of tube 43. The flip-flop is then driven to its other stable condition, whereupon a positive output is derived from the plate of tube 43 and is applied to the odd amplifier 42. This amplifier applies a negative pulse to the even grids in the counter stage, thus advancing the count one.

Accordingly, there has been described and shown herein a novel, useful system for providing linearizing compensations in counting the pulse output from a source which is nonlinear in predetermined areas. In an embodiment of the invention which was built, it was found possible to linearize the digital indication of the transducer output to less than ±½ part error per 1000. Only three correction points on either side of the midpoint, or a total of six correction points, were required.

I claim:

1. A system for providing a linear count indication responsive to pulses from a nonlinear source comprising a pulse counter of the type having two inputs and requiring an alternate application of pulses to said two inputs to advance the count of said counter, means to alternately apply pulses from said source to said two inputs, first means to sense when said pulse-counting means attains a first predetermined count condition in a nonlinear input region, means responsive to said sensing by said first means to operate said means to alternately apply pulses to apply a succeeding pulse from said source to the same input as the pulse from said source which it succeeded, second means to sense when said pulse-counting means attains a second predetermined count condition, and means responsive to said second means sensing to operate said means to alternately apply pulses to apply a pulse to advance said pulse counter prior to the next pulse succeeding the pulse which advanced said pulse counter to said second count condition.

2. A system for providing a linear count indication as recited in claim 1 wherein said means to alternately apply pulses from said source to said two inputs includes a flip-flop circuit having alternate outputs and an input, a first and second gate respectively coupled to said alternate outputs, and said means responsive to said sensing by said first means includes means to simultaneously apply a pulse to drive said flip-flop and to block the one of said gates receiving an output responsive thereto.

3. A system for providing a linear count indication as recited in claim 1 wherein said means to alternately apply pulses from said source to said two inputs includes a flip-flop circuit having alternate outputs and an input, a first and second gate respectively coupled to said alternate outputs, and said means responsive to said sensing by said second means includes flip-flop means to apply a pulse to said flip-flop input.

4. A system for providing a linear count indication responsive to pulses from a source having nonlinear regions comprising a pulse counter of the type having two inputs and requiring an alternate application of pulses to said two inputs to advance the count of said counter, a flip-flop circuit having an input and alternate outputs, means to apply pulses from said source to said input, a first and a second amplifier respectively coupled between said alternate outputs of said flip-flop and said two inputs of said pulse counter, first means to sense when said pulse counter attains a first predetermined count condition in a nonlinear region of said source, means responsive to sensing by said first means to drive said flip-flop prior to a succeeding pulse to provide an output and to block the one of said amplifiers to which said output is applied, second means to sense when said pulse counter attains a second predetermined count condition in a nonlinear region of said source, and means responsive to sensing by said second means to drive said flip-flop prior to a succeeding pulse to provide an output.

5. A system for providing a linear count indication as recited in claim 4 wherein said means to apply pulses from said source to said flip-flop input includes a counter gate having its output coupled to said flip-flop input, and having a first input to which pulses from said source are applied and a second enabling input, means to generate enabling pulses having a duration to establish a desired counting interval, means to apply said enabling pulses to said second enabling input, and means responsive to the termination of an enabling pulse to re-establish after the lapse of a desired interval said counter in a desired initial count condition.

6. A system as recited in claim 5 wherein said pulse counter includes means to maintain inoperative said means responsive to sensing by said first means and said means responsive to sensing by said second means until said pulse counter has passed through a zero-count condition after being reset.

7. A system as recited in claim 5 wherein said means to apply said enabling pulses includes a latch gate having an output, a first input to which enabling pulses are applied and a second disenabling input, a control flip-flop having an input to which said latch gate output is coupled and having alternate outputs, and a latch flip-flop circuit having an input and alternate outputs, one of said control flip-flop alternate outputs being coupled to the enabling input of said count gate and the other being coupled to said latch flip-flop input, one of said latch flip-flop alternate outputs being applied to said latch gate disenabling input, and said means responsive to the termination of an enabling pulse to re-establish, after a desired interval, said counter in a desired initial count condition includes a reset pulse generator to which said other of said latch flip-flop outputs is coupled, a delay network to which output from said reset pulse generator is applied, means to apply output from said delay network to said latch flip-flop, and means to reset said counter to a desired initial count condition with the output from said reset pulse generator.

8. The combination of a measuring transducer of the type providing output pulses having a frequency which may vary nonlinearly with variations in the quantity being measured and a counter for linearizing variations in said quantity and the count of said counter, said counter comprising pulse-counting means, means to apply pulses from said transducer to said counting means, first means to sense when said pulse-counting means attains a first predetermined count condition in a nonlinear input region, means responsive to said sensing by said first means to place said means to apply pulses in a condition to prevent a succeeding pulse applied therefrom to said pulse-counting means from being counted, second means to sense when said pulse-counting means attains a second predetermined count condition in a nonlinear input region, and means responsive to said sensing by said second means to cause said means to apply pulses to advance the count in said pulse-counting means before a succeeding pulse is applied therefrom.

9. The combination of a measuring transducer of the type providing output pulses having a frequency which may vary nonlinearly with variations in the quantity being measured and a counter for linearizing variations in said quantity and the count of said counter, said counter comprising pulse counting means of the type having two inputs and requiring an alternate application of pulses to said two inputs to advance the count of said counter, means to alternately apply pulses from said source to said two inputs, first means to sense when said pulse-counting means attains a first predetermined count condition in a nonlinear input region, means responsive to said sensing by said first means to operate said means to alternately apply pulses to apply a succeeding pulse from said source to the same input as the pulse from said source when it succeeded, second means to sense when said pulse-counting means attains a second predetermined count condition, and means responsive to said second means sensing to operate said means to alternately apply pulses to apply a pulse to advance said counter prior to the next pulse succeeding the pulse which advanced said counter to said second count condition.

10. The combination of a measuring transducer of the type providing output pulses having a frequency which may vary nonlinearly with variations in the quantity being measured and a counter for linearizing variations in said quantity and the count of said counter, said counter comprising pulse counting means of the type having two inputs and requiring an alternate application of pulses to said two inputs to advance the count of said counter, a flip-flop circuit having an input and alternate outputs, means to apply pulses from said source to said input, a first and a second amplifier respectively coupled between said alternate outputs of said flip-flop and said two inputs of said pulse counting means, first means to sense when said pulse counting means attains a first predetermined count condition in a nonlinear region of said source, means responsive to sensing by said first means to drive said flip-flop prior to a succeeding pulse to provide an output and to block the one of said amplifiers to which said output is applied, second means to sense when said pulse counting means attains a second predetermined count condition in a nonlinear region of said source, and means responsive to sensing by said second means to drive said flip-flop prior to a succeeding pulse to provide an output.

11. Pulse counting apparatus in combination with a condition responsive device affording a pulse output which varies nonlinearly with changes in the condition being sensed, said apparatus comprising, a pulse counter associated with said condition responsive device to receive the output thereof, sensing means to sense when a predetermined nonlinear condition exists between variation in said condition being sensed and variation in the pulse output of said device, and means responsive to said sensing by said sensing means to prevent one pulse in the output of said device from being counted by said pulse counter, whereby the count of said counter is caused to vary linearly with variation in the condition being sensed by said condition responsive device.

12. Pulse counting apparatus in combination with a condition responsive device affording a pulse output which varies nonlinearly with changes in the condition being sensed, said apparatus comprising, a pulse counter associated with said condition responsive device to receive the output thereof, sensing means to sense when a predetermined nonlinear condition exists between variation in said condition being sensed and variation in the pulse output of said device, and means responsive to said sensing by said sensing means to cause said counter to receive at least one pulse in addition to the pulses received thereby from said condition responsive device, whereby the count of said counter is caused to vary linearly with variation in the condition being sensed by said condition responsive device.

13. Pulse counting apparatus in combination with a condition responsive device affording a pulse output which varies nonlinearly with changes in the condition being sensed, said apparatus comprising, a pulse counter associated with said condition responsive device to receive the output thereof, first means to sense when a first predetermined nonlinear condition exists between variation in said condition being sensed and variation in the pulse output of said device, means responsive to said sensing by said first means to prevent one pulse in the output of said device from being counted by said pulse counting means, second means to sense when a second predetermined nonlinear condition exists between variation in said condition being sensed and variation in the pulse output of said device, and means responsive to said sensing by said second means to cause said counter to receive at least one pulse in addition to the pulses counted thereby from said condition responsive device, whereby the count of said counter is caused to vary linearly with variation in the condition being sensed by said condition responsive device.

14. Pulse counting apparatus in combination with a condition responsive device affording a pulse output which varies nonlinearly with changes in the condition being sensed, said apparatus comprising, a pulse counter having two inputs associated with said condition responsive device and requiring alternate application of pulses to said inputs from said device to advance the count, sensing means to sense when a predetermined nonlinear condition exists between variation in said condition being sensed and variation in the pulse output of said device, and means responsive to said sensing by said sensing means to prevent one pulse in the output of said device from being counted by said pulse counter, whereby the count of said counter is caused to vary linearly with variation in the condition being sensed by said condition responsive device.

15. Pulse counting apparatus in combination with a condition responsive device affording a pulse output which varies nonlinearly with changes in the condition being sensed, said apparatus comprising, a pulse counter having two inputs associated with said condition responsive device and requiring alternate application of pulses to said inputs from said device to advance the count, sensing means to sense when a predetermined nonlinear condition exists between variation in said condition being sensed and variation in the pulse output of said device, and means responsive to said sensing by said sensing means to cause said counter to receive at least one pulse in addition to the pulses received thereby from said condition responsive device, whereby the count of said counter is caused to vary linearly with variation in the condition being sensed by said condition responsive device.

References Cited in the file of this patent
UNITED STATES PATENTS
2,756,934    Ziffer _____ July 31, 1956

OTHER REFERENCES
Electronic Engineer, April 1954, "An Industrial Batching Counter," by Brierley, pp. 157–60 (Fig. 3 on p. 158 is of particular interest.